E. L. EMORY.
VALVE.
APPLICATION FILED AUG. 2, 1911.
1,050,724.
Patented Jan. 14, 1913.
2 SHEETS—SHEET 1.
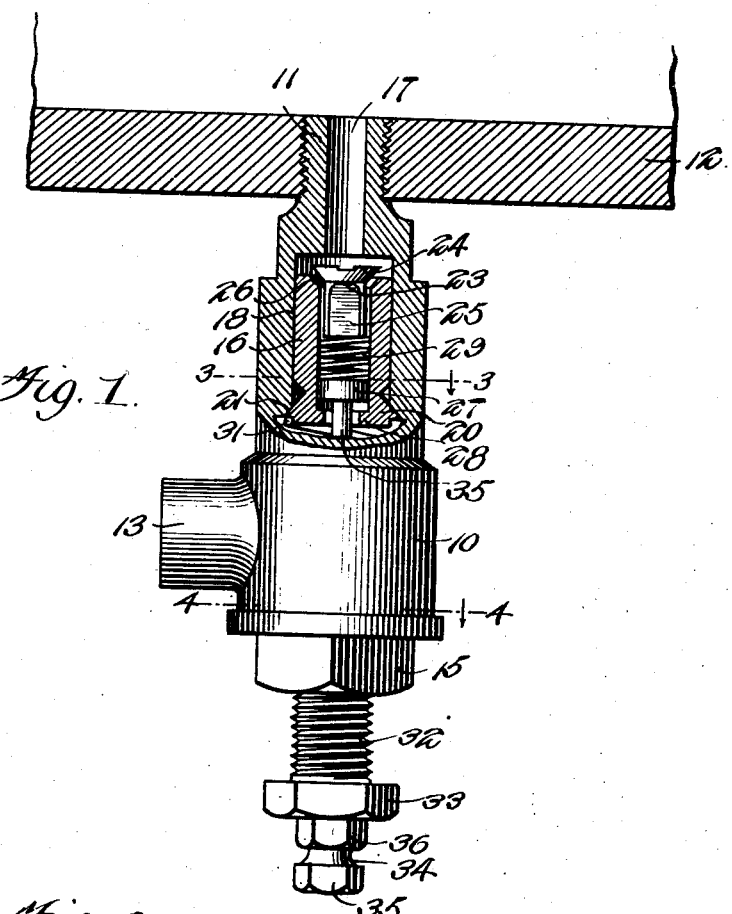
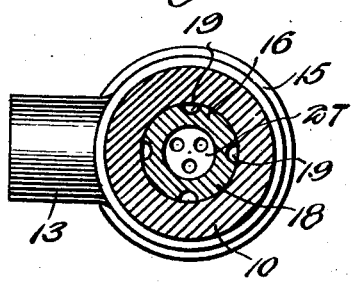
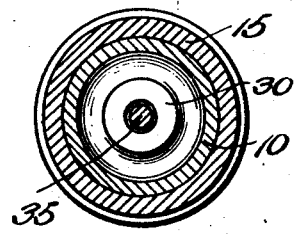
Witnesses
Inventor
Eugene L. Emory
By Victor J. Evans
Attorney

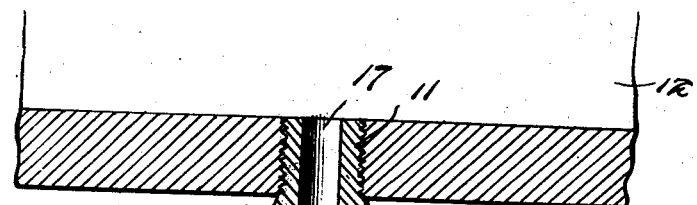
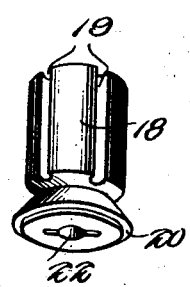
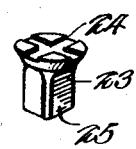

UNITED STATES PATENT OFFICE.

EUGENE L. EMORY, OF SUFFOLK, VIRGINIA, ASSIGNOR OF ONE-HALF TO JOHN R. ELLISON, OF SUFFOLK, VIRGINIA.

VALVE.

1,050,724.

Specification of Letters Patent.   Patented Jan. 14, 1913.

Application filed August 2, 1911.   Serial No. 641,889.

*To all whom it may concern:*

Be it known that I, EUGENE L. EMORY, a citizen of the United States, residing at Suffolk, in the county of Nansemond and State of Virginia, have invented new and useful Improvements in Valves, of which the following is a specification.

An object of the invention is to provide a valve for use in connection with engine cylinders, to drain the products of condensation from the cylinder and act as a relief for any excess pressure in the cylinder.

To accomplish the desired result, use is made of a casing provided with nipple for attachment to the engine cylinder, the casing being provided with an outlet, a cover for the said casing, a spring actuated adjustable drain valve mounted within the casing and adapted for draining the products of condensation from the cylinder and a spring actuated adjustable relief valve mounted within the casing for relieving the cylinder of any excess pressure, independently operable means being provided for controlling the said drain valve and said relief valve.

Reference is to be had to the accompanying drawings, constituting a part of this specification, in which similar characters of reference denote corresponding parts in all the views, and in which—

Figure 1 is a side elevation of my valve, showing the same attached to the cylinder of an engine, parts being broken away to disclose the underlying structure, the drain valve being open to drain the products of condensation from the cylinder, the relief valve being in closed position. Fig. 2 is a vertical longitudinal sectional view of my device, the drain valve being in closed position and the relief valve being in open position to permit the escape of any excess pressure in the cylinder. Fig. 3 is a horizontal sectional view taken on the line 3—3 in Fig. 1, looking in the direction of the arrow. Fig. 4 is a horizontal sectional view taken on the line 4—4 in Fig. 1, looking in the direction of the arrow. Fig. 5 is a perspective view of the relief valve. Fig. 6 is an inverted perspective view of the drain valve.

Referring more particularly to the views, I provide a casing 10 having an end thereof terminating in a threaded nipple 11 for attachment to a cylinder 12 of an engine, the casing 10 being provided with an internally threaded nipple 13 constituting an outlet and adapted to have a drain pipe connected thereto. The lower end of the casing 10 is provided with a recess 14 in which is threadedly retained a cover 15.

Slidably mounted within the casing 10 is a relief valve 16 having an end thereof positioned at one end of the casing 10 to encircle the inner end of an opening 17 in the nipple 11. The relief valve 16 consists of a cylindrical body 18, provided on its periphery with a series of longitudinally extending grooves 19 and having a beveled head 20 adapted to seat on a valve seat 21 in the casing 10, the cylindrical body 18 being tubular and provided at the lower end with a wing-shaped opening 22 for a purpose that will be hereinafter more fully disclosed. A drain valve 23, having a grooved head 24 and a shank 25 is positioned so that the head 24 thereof will close the inner end of the inlet opening 17 with the shank 25 extended into the tubular portion of the relief valve 16, the relief valve 16 being provided with a beveled valve seat 26 against which the inner end of the head 24 of the drain valve 23 is adapted to seat. A perforated block 27 is slidably mounted in the tubular portion of the relief valve 16, at the lower end thereof, the head 20 of the relief valve being provided with an inwardly extending flange 28 against which the block 27 is adapted to abut, the said block being adapted to register with the wing-shaped opening 22 of the relief valve 16. Positioned to abut against the block 27 is an expansible spring 29 having the other end thereof abutting against the inner end of the shank 25 of the drain valve 23 to normally retain the head 24 of the drain valve against the casing 10 to close the inlet opening 17. Slidably mounted to repose within the lower end of the casing 10 is a spring seat 30 against which one end of an expansible spring 31 is adapted to abut, the other end of the spring 31 being positioned to abut against the outer side of the head 20 of the relief valve 16 as shown in Fig. 2.

An adjusting screw 32, having a head 33 is threadedly extended through the lower end of the cover 15 and has the inner end thereof abutting against the spring seat 30 so that when the adjusting screw 32 is operated, the spring seat 30 will be actuated to either increase or decrease the tension of the spring 31, thus tending to adjust the relief valve 16 relatively to the casing 10. An auxiliary screw 34 is mounted to threadedly extend through the adjusting screw 32 and terminates in the rod 35 extended through the casing 10 and having the outer end thereof extended through the wing-shaped opening 22 and abutting against the block 27.

The outer end of the auxiliary adjusting screw 34 is provided with a knurled head 35 for operating the screw 34 and when the mentioned screw is operated, the tension of the spring 29 can be either increased or decreased as will be hereinafter more fully disclosed. A lock nut 36 is threadedly mounted on the auxiliary adjusting screw 34 near the outer end thereof and the mentioned lock nut is adapted to abut against the head 33 of the adjusting screw 32 to lock the auxiliary adjusting screw 34 relatively to the adjusting screw 32.

In the application of my device, when the nipple 11 is engaged with the cylinder of an engine, the relief valve 16 and the drain valve 23 are adjusted by means of the adjusting screws 32 and 34 respectively, the adjustment of the mentioned valves being in proportion to the products of condensation in the cylinder and the excess pressure that may be produced in the cylinder by the steam contained therein. It will be understood that the spring 29 is of less tension than the spring 31 and when the products of condensation in the cylinder become great enough to act against the spring 29, the head 24 of the drain valve 23 will be moved a slight distance away from the end of the casing 10 to open the inlet opening 17, while at the same time the head 24 will be spaced from the end of the relief valve 16, thus permitting the products of condensation in the cylinder to flow outwardly through the inlet 17 and through the tubular portion of the relief valve 16, thence through the perforations in the block 27 and into the casing 10, from which the mentioned products of condensation will flow outwardly through the outlet in the nipple 13. When, however, an excess of the mentioned steam pressure is produced in the cylinder, the said pressure will force the head 24 of the drain valve 23 against the valve seat 26 of the relief valve 16 and if the pressure in the cylinder is greater than the tension in the spring 31, the relief valve 16 will be unseated from the valve seat 21, thus permitting the pressure in the cylinder to escape outwardly through the grooves 19 in the relief valve and into the casing 10 from which the mentioned pressure will flow outwardly through the outlet in the nipple 13, as will be readily understood. Thus, it will be seen that when an excess pressure is generated in the cylinder, the relief valve 16 will be operated to permit the excess pressure to escape from the cylinder and when there is no excess pressure in the cylinder the products of condensation or water contained in the cylinder will flow outwardly through the tubular portion of the relief valve 16, owing to the action of the drain valve 23, the products of condensation being of sufficient quantity to act against the tension of the spring 29, while an excess pressure in the cylinder must be an excess pressure to act against the tension of sufficient force to act against the tension of the spring 21 in order to actuate the relief valve 16. With a construction of this kind, when there is no excess pressure in the cylinder, the products of condensation the cylinder, the products of condensation can at all times escape through the tubular portion of the relief valve and when there is an excess pressure in the cylinder, the products of condensation together with the excess pressure will escape through the grooves 19 of the relief valve 16, the drain valve 23 at this time being in closed position relatively to the relief valve. By operating the adjusting screw 32, the tension of the spring 31 can be controlled at all times and by operating the auxiliary adjusting screw 34, the tension of the spring 29 can be controlled, thus providing a means for controlling the action of the relief valve 16 and the drain valve 23, as will be readily understood by referring to Fig. 2. When the lock nut 36 is operated to abut against the head 33 and the auxiliary adjusting screw 34 is operated to adjust the tension of the spring 29, the tension of the spring 31 will be proportionally adjusted, inasmuch as the lock nut 36 in engagement with the head 33 will lock the auxiliary adjusting screw 34 relatively to the adjusting screw 32.

Having thus fully described the invention, what I claim as new, is:

1. In a valve, the combination with a casing provided with an inlet and outlet, a tubular relief valve slidably mounted within the said casing, a drain valve slidably mounted within the tubular portion of the said relief valve and adapted to normally close the inlet to the said casing, an inwardly extending flange on the lower end of said relief valve, a perforated disk in said tubular portion of said relief valve and normally resting on the said flange, a spring positioned to abut against the said perforated disk and the said drain valve, compression means between relief valve and the casing, means for adjusting the relief valve, and auxiliary means extending up through the casing into the tubular portion of the relief valve and engageable with the said perforated disk for adjusting said drain valve.

2. In a valve, the combination with a casing provided with an inlet and outlet, a relief valve having an annular bore in a portion thereof, an instruck flange at the lower end of said relief valve, the same being provided with a wing-shaped opening, a spring between the disk and drain valve, compression means acting on said relief valve, adjusting means for the relief valve, and auxiliary means passed through the first-mentioned adjusting means and extending up through the said wing-shaped opening to engage said perforated disk for adjusting said drain valve.

In testimony whereof I affix my signature in presence of two witnesses.

EUGENE L. EMORY.

Witnesses:
E. EDMONSTON, Jr.,
D. W. GOULD.